United States Patent [19]

Brandi et al.

[11] Patent Number: 4,618,439

[45] Date of Patent: Oct. 21, 1986

[54] MULTIFUNCTIONAL ADDITIVE FOR LUBRIFICATING OILS AND PROCESS FOR THE PREPARATION THEREOF

[75] Inventors: Gabriella Brandi, S. Donato Milanese; Paolo Koch, Melegnano; Stefano Maiorana; Piero Dalla Croce, both of Milan; Clara Baldoli, Vimodrone, all of Italy

[73] Assignees: AGIP Petroli S.p.A.; Consiglio Nazionale Delle Ricerche, both of Rome, Italy

[21] Appl. No.: 742,735

[22] Filed: Jun. 10, 1985

[30] Foreign Application Priority Data

Jun. 15, 1984 [IT] Italy .................. 21428 A/84

[51] Int. Cl.$^4$ ........................... C10M 145/14
[52] U.S. Cl. ..................... 252/47.5; 252/47; 252/50
[58] Field of Search ............ 252/47, 47.5, 50

[56] References Cited

U.S. PATENT DOCUMENTS

| | | | |
|---|---|---|---|
| 4,092,255 | 5/1978 | Chapelet et al. | 252/47 |
| 4,160,739 | 7/1979 | Stambaugh et al. | 252/50 |
| 4,161,452 | 7/1979 | Stambaugh et al. | 252/50 |
| 4,229,311 | 10/1980 | Wenzel et al. | 252/50 |

Primary Examiner—Jacqueline V. Howard
Attorney, Agent, or Firm—Hedman, Gibson, Costigan & Hoare

[57] ABSTRACT

Multifunctional additive for lubricating oils consisting of a base copolymer and of monomers grafted to said base copolymer;

said base copolymer being the product of copolymerization of at least an alkyl metacrylate containing from 1 to 4 carbon atoms in its alkyl group, with at least an alkyl metacrylate containing from 10 to 18 carbon atoms in its alkyl group;

said graft monomers comprising at least a member selected from the class consisting of N-vinylimidazoles, N-vinylpyrrolidones, vinylpyridines and N,N-dialkylaminoethyl-metacrylates; and at least a member selected in the class of compounds definable by means of the general formula:

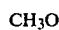

$$CH_2=C-C-[O-CH_2CH_2]_n-NHR$$

wherein:
n is 0 or 1;
R is a group selected from:

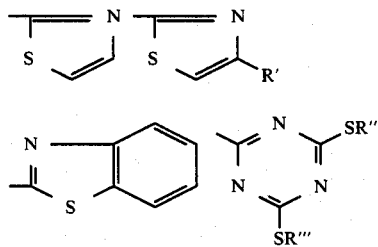

(R', R" and R''' being alkyl groups of from 1 to 18 carbon atoms).

The process for the production of such an additive comprises a first reaction step wherein at least one alkyl metacrylate containing from 1 to 4 carbon atoms in its alkyl group is partly or fully copolymerized with at least an alkyl metacrylate containing from 10 to 18 carbon atoms in its alkyl group; followed by a second reaction step, wherein said copolymerization is completed, if it is not completed in the first step, and to the polymer the above mentioned monomers are grafted.

14 Claims, No Drawings

MULTIFUNCTIONAL ADDITIVE FOR LUBRIFICATING OILS AND PROCESS FOR THE PREPARATION THEREOF

The present invention relates to an additive for lubricating oils, capable of increasing their viscosity index and of imparting characteristics of dispersability, detergency, antiwear, corrosion-proofing and pour-point lowering.

The invention relates also to a process for the preparation of such an additive, as well as to the compositions of lubricating oil containing the same additive.

It is known and usual in the field of the art relating to the lubricant oils, to add into the same an oil-soluble polymer capable of improving the behaviour of the viscosity thereof with varying temperatures. This oil-soluble polymer, also named as Viscosity Index Improver (V.I.I.), can consist e.g. of a polymer or of a copolymer of an alkyl-acryl- or -metacrylester, containing a suitable number of carbon atoms in its alkyl group.

It is also known in the art to introduce into said oil-soluble polymer a nitrogen-containing copolymerizable or graftable monomer, especially an heterocyclic monomer, and this to the purpose of conferring to the resulting product dispersability characteristics, together with the viscosity-index improving characteristics.

Said copolymerizable or graftable nitrogen-containing monomer, also named as dispersant monomer, is generally selected among vinylimidazoles, vinylpyrrolidones, vinylpyridines and N,N-dialkyl-aminoethyl-metacrylates.

As regards such known art, reference is made to the specification of the following Patents: U.K. No. 1,272,161 and No. 1,333,733; U.S. No. 3,732,334; and Belgian Pat. No. 874.068.

The introduction of the dispersant monomer into the oil-soluble polymers causes however a decrease of the solubility of this latter in the oil. The amount of dispersant monomer which can be introduced into the oil-soluble polymer is therefore limited and as a consequence, the dispersability characteristics which can be given to the same polymer are limited. Moreover, when the dispersant monomer is introduced into the oil-soluble polymer, either by copolimerization or by grafting, the formation unavoidably occurs of more or less great amounts of homo-polymer of said dispersant monomer. This is disadvantageous, in that the homopolymer is generally insoluble or at least poorly soluble in the oil.

It is therefore a purpose of the present invention an additive for lubricating oils, which is free, or essentially free, from the hereinabove described drawbacks.

In the field of lubricating oils there presently exists the need of having available additives, capable of performing at the same time a plurality of desirable functions to the purpose of reducing the overall amount of the additives and of avoiding phenomena of interaction or of mutual incompatibility between the same additives. It is therefore another purpose of the present invention an additive for lubricant oils, capable of improving the viscosity index thereof and of conferring characteristics of dispersability, detergency, anti-wear, corrosion-proofing and pour-point lowering thereto.

It is a further purpose of the present invention the process for the preparation of the additive having such a whole of desired characteristics.

A further purpose of the invention are the compositions of lubricating oil containing such an additive.

Other purposes of the invention shall be clear from the following disclosure:

The present invention is essentially based on the use of particular monomers, containing within their molecule nitrogen and sulphur atoms, which are grafted to a copolymer of metacryl esters, together with one or more tradition al monomer(s), originating graft polymers highly soluble in oil and capable of performing all the hereinabove mentioned functions in the compositions if lubricating oil. The joint use of the traditional monomers and of the novel monomers allows moreover, during their grafting to the copolymer of metacrylic esters, the formation of unusually low levels of copolymer and however the formation of a homopolymer provided with high solubility in the lubricant oil.

Accordingly, the multifunctional additive for lubricating oils of the present invention is a graft copolymer with a weight average molecular weight of from 50,000 to about 600,000, consisting of a base copolymer and of an amount of from 1 to 20 parts by weight of grafted monomers per each 100 parts by weight of the base copolymer;

said base copolymer being the product of the copolymerization of an alkyl metacrylate, containing from 1 to 4 carbon atoms in its alkyl radical, with at least an alkyl metacrylate, containing from 10 to 18 carbon atoms in its alkyl radical, in such a ratio to each other that the average number of carbon atoms in the alkyl radical is of from 11 to 15;

said grafted monomers comprising at least a member selected from the class consisting of: N-vinylimidazoles, N-vinylpyrrolidones, vinylpyridines and N,N-dialkylaminoethyl-methacrylates; and at least a member selectet from the class of compounds definable by means of the general formula:

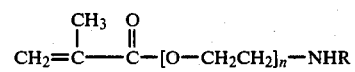

wherein:
n is 0 or 1;
R is a group selected among:

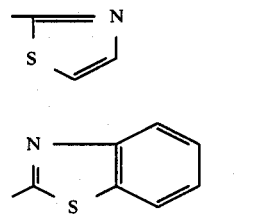
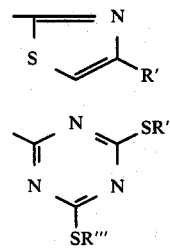

(R', R" and R'" being alkyl groups containing from 1 to 18 carbon atoms).

Specific examples of alkyl metacrylates containing from 1 to 4 carbon atoms in their alkyl group, useful to the purposes of the present invention, are methyl methacrylate, ethyl metacrylate, n.propyl metacrylate and n.butyl metacrylate. Methyl methacrylate is the most preferred among them.

Specific examples of alkyl metacrylates containing from 10 to 18 carbon atoms in their alkyl group, useful to the purposes of the present invention, are the metacrylates of alcohols of natural origin, as e.g. lauryl and palmityl alcohol, or of synthetic alcohols, obtained e.g.

by the oxo synthesis of olefins with both terminal and internal unsaturation and having therefore both a straight and a branched-chain structure, it being it possible to use such alcohols both as single compounds, or as mixtures of each other.

Preferably, in the base copolymer an amount is present of from 5 to 20 parts by weight of alkyl methacrylate containing from 1 to 4 carbon atoms in its alkyl group per each 100 parts by weight of alkyl methacrylate containing from 10 to 18 carbon atoms its alkyl group.

Specific examples of monomers belonging to the classes of N-vinylimidazoles, N-vinylpyrrolidones, vinylpyridines and N,N-dialkyl-aminoethyl-metacrylates, useful to the purposes of the present invention, are: N-vinylimidazole, 2-methyl-N-vinylimidazole, N-vinylpyrrolidone, 2-vinylpyridine, 3-vinylpyridine, 4-vinylpyridine, 2-methyl-5-vinylpyridine, 4-methyl-2-vinylpyridine, 5-ethyl-2-vinylpyridine, 2-butyl-5-vinylpyridine and N,N-dimethylaminoethyl-metacrylate.

Specific examples of monomers containing nitrogen and sulphur, useful to the purposes of the present invention, are:

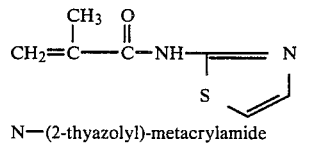

N—(2-thyazolyl)-metacrylamide

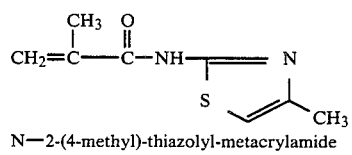

N—2-(4-methyl)-thiazolyl-metacrylamide

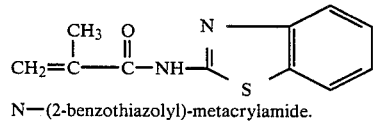

N—(2-benzothiazolyl)-metacrylamide.

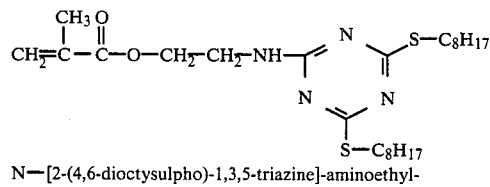

N—[2-(4,6-dioctysulpho)-1,3,5-triazine]-aminoethyl-metacrylate.

Preferably, in the graft copolymer the monomer(s) belonging to one of the two specified classes is (are) present in an amount of from 20 to 80 parts by weight per 100 parts by weight of the total of the monomers belonging to both classes.

Moreover, in the preferred embodiment of the present invention the graft copolymer has a weight average molecular weight of from 100,000 to about 400,000.

The graftable nitrogen- and sulphur-containing monomers hereinabove defined, can be prepared by means of the processes reported hereinunder.

The graft copolymer of the present invention is generally prepared by means of a process consisting of two consecutive steps, wherein:

in the first step, at least one alkyl metacrylate containing from 1 to 4 carbon atoms in its alkyl group is partly or wholly copolymerized with at least one alkyl metacrylate containing from 10 to 18 carbon atoms in the alkyl group; and in the second step the copolymerization of metacryl esters is completed if necessary, and the dispersant monomers are grafted.

More particularly, in the first step of either partial or total copolymerization, the reaction is carried out in the liquid phase in an organic solvent, preferably constituted by a mineral oil (e.g., Solvent Neutral 5.4 cSt at 100° C. hereinunder indicated as Sn 150), in the absence of oxygen at a temperature of from 70° to 130° C., in the presence of a radical catalyst, until from 60 to 100% of metacryl esters are transformed into the revelant polymer. Radical catalysts suitable to this purpose are generally selected among tert.butyl-peroctanoate, tert.butyl-per-(2-ethyl)-hexanoate, tert.butyl-per-isononanoate, tert. butyl-perbenzoate, azo-bis-isobutyronitrile, dibenzoylperoxide, di-lauroil-peroxide and bis-(4-tert.butylcyclohexyl)-peroxydicarbonate and are used in amounts of from 0.2 to 3 parts by weight per each 100 parts by weight of metacryl esters. In the reaction mixture, sulphur-containing substances may be present, such as aliphatic mercaptans, thioglycols and thiophenoles (e.g., tert.dodecylmercaptan and ethanedithiol) whose function is of regulating the molecular weight of the polymer. Such sulphur-containing substances carry out such an activity in an amount of from 0.01 to 0.5 parts by weight per each 100 parts by weight of metacryl esters. The progress of the copolymerization can be followed by I.R. analysis. When the conversion of monomers has reached the pre-determined value, generally in a time of from 0.5 to 4 hours, for the values of temperature and under the other conditions as hereinabove indicated, at least one monomer belonging to each one of the aforeshown classes is added. The reaction is then continued by grafting the dispersant monomers and completing if necessary the polymerization of metacryl esters, after the preliminary addition of peroxidic catalysts, such as tert.butyl peroctanoate, tert.butyl-per-(2-ethyl)-hexanoate, tert.butyl-per-isononanoate, and tert.butyl-perbenzoate, up to the complete or substantially complete conversion of the monomers, and until a molecular weight of the graft polymer within the range of hereinabove shown values is reached. The times necessary to that purpose are generally of from 3 to 6 hours.

In this way the graft polymer, i.e. the lubricant additive of the present invention, is obtained, capable of showing, in the composition of lubricating oils, the characteristics of viscosity index improving, dispersability, detergency, anti-wear and pour-point lowering.

The lubricating oil compositions according to the present invention comprise a larger amount of lubricating oil and a minor amount of the hereinabove disclosed additive, the percentage content of this latter being a function of the particular oil and of the particular applications for which the composition itself is intended.

The following experimental Examples are illustrative and not limitative of the invention.

EXAMPLE 1

Into a lined reactor, equipped with rotary-blade stirrer, termocouple connected with a temperature recorder, dropping funnel and spherical-bulb cooler, water-cooled and connected to a nitrogen cylinder, there are loaded 225 g of a mixture of alkyl methacrylate containing from 12 to 15 carbon atoms in their alkyl group, obtained by transesterification of equimolar amounts of methyl metacrylate with synthetic alcohols (commercial product LIAL 125 of the firm CHIMICA AUGUSTA), constituted by a mixture of straight or branched-chain alchols from oxo-synthesis, containing from 12 to 15 carbon atoms in the molecule, 110 g of mineral oil SN 150 and 0.7 g of tert.dodecyl-mercaptan. The reactor inner temperature is adjusted at 83° C., by circulating inside the wall cavity thereof a heating fluid outcoming from a thermostatic bath, and nitrogen is blown, over one hour, up to the complete removal of oxygen. Twenty-five grams of separately outgassed methyl methacrylate, and 0.8 g of tert.butyl-peroctanoate are then introduced.

The radical polymerization of the monomers is immediately initiated, as it is evidenced by the increasing trend of the temperature of the mass contained in the reactor. It is therefore necessary to adjust the thermostatic bath, so as to maintain constant the reaction temperature. The course of the copolymerization reaction is followed by means of the recording of I.R. spectra, on the basis of the fact that the intensity of the infrared bands at 1632, 1320, 1295 and 939 cm$^{-1}$ related to the presence of the monomers, decreases, and that the intensity increases of the bands at 1265, 1235 and 965 cm$^{-1}$ typical of the copolymer being formed.

The concentration of the initiator is verified as well, by means of the I.R. band at 1775 cm$^{-1}$.

About 60 minutes after the beginning of the copolymerization, the monomers are converted by 90% into their related polymer, and 5 g of N-vinylimidazoles and 5 g of N-(2-thiazolyl)-metacrylate are introduced. The reaction is continued over a further 2.5 hours, adding portions of 0.2 g of the peroxidic catalyst after one hour and after two hours from the addition of the graftable monomers.

At the end of the said time period, the reaction is considered to be complete, in that at the I.R. analysis the typical absorption bands in the 1640 cm$^{-1}$ have disappeared. The graft polymer, i.e. the additive according the present invention, thus obtained has a weight average molecular of about 300.000.

The so-obtained reaction product has the appearance of a clear solution and solutions obtained by diluting it with oil are clear and bright.

The reaction product is diluted with 160 g of mineral oil SN 150, so as to adjust the kinematic viscosity of the resulting composition at 1000 cSt at 100° C.

The measurement of the characteristics of the additive as for the viscosity index improvement (i.e. of its behaviour as viscosity index improver, V.I.I., is carried out on a solution of 10% by weight of the additive in mineral oil SN 150.

Kinematic viscosity at 100° C.: 13.7 cSt (ASTM D 445).

Depolymerization according to DIN 51382 (corresponding to the test CEC-L-14-A-78): 15%.

The turbidity of the solution of 30% by weight of the additive in mineral oil SN 150 is of 3.5 F.T.U. An additive obtained by means of a process identical to the proceding one, using only N-vinylimidazole (10 g) in the grafting step shows, in a 30% by weight solution in mineral oil SN 150 shows a turbidity of 28.5 F.T.U.

The turbidity measurements are carried out by means of the digital turbidimeter TRM-L manufactured by the firm DROTT of Wien, calibrated with standard aqueous solutions of formazine (Formazine Turbidity Units).

The performance of the additive as for its dispersant characteristics is evidenced by means of a laboratory test and by means of an engine test, as described hereinunder.

The laboratory test is based on the capability of the additive to hold asphaltenes in suspension in mineral oil SN 150. In particular, asphaltenes are prepared as indicated in the specification of U.S. Pat. No. 4,146,489 by oxidizing a mineral oil of naphthenic type with air at 175° C. for 72 hours.

The precipitated solid is separated by filtration on Millipore filter (12 μm), repeatedly washed with petroleum ether and dried in air. Of this product, the portion soluble in methylene chloride is then extracted, which is used at 0.5% concentration. To an amount of 20 g of solution containing from 0.05 to 0.10% by weight of the additive in mineral oil SN 150, 10 ml are added, under stirring, of the asphaltene solution prepared as hereinabove indicated.

The volatile fractions are then removed, by placing the sample inside a forced air-circulation oven at 150° C. for one hour.

The evaluation of the dispersability is carried out by means of two sets of turbidity measurements: the first one on the solution prepared as indicated above, brought to room temperature, and stirred in order to homogenize it; the second one on the same solution after centrifugation at 7,500 rpm, for a time of 10 minutes. The first measurement is already an indication of the dispersant power of the additive, in that the valuable additives prevent the agglomeration of asphaltene particles and give rise to substantially clear solutions.

The second measurement gives an idea of the amount of dissolved asphaltene and coincides with the first one if the additive prevents the agglomeration and hence the separation of asphaltenes.

The number named as Dispersability Index, which is the percent ratio between the turbidity values of the solution (expressed as F.T.U.) after and before the centrifugation, is considered as indicative, in that it correlates the results obtained to the engine test. The turbidity is still measured by means of the digital turbidimeter TRM-L by the firm DROTT of Wien. The additive prepared as previously disclosed, gives a value of 100 as dispersability index.

The engine test is carried out on a FIAT 600D engine on the bench, according to the procedure CEC-L-04-A-70.

This test is normally used to the purpose of evaluating the anti-sludge and dispersant characteristics of lubricants for gasoline engines operating under low-temperature conditions, typical conditions to be met in urban journeys.

The method is essentially based on the evaluation of sludge accumulation which can be observed in the centrifugal filter and on stationary units during the test.

For the test a multigrade oil SAE 15 Q 40 is used, to which an amount of 6.8% has been added of a traditional formulation of engine oil additives and of 8.0% of the additive prepared as previously disclosed. The sludges in the centrifugal filter after the test are in an amount of 30 g.

An engine oil formulated in the same way with 6.8% of additive formulation and with 8.0% of a non-dispersant commercial polymethylmetacrilate gave, after the test, 80 g of sludge in the centrifugal filter.

The evaluation of the antiwear characteristics of the additive is carried out by means of the Almen-Wieland machine according to the method suggested by the manufacturer and by means of the 4-ball Wear Machine according to ASTM D 2266, using solutions of the additive in a mineral oil SN 150, of viscosity of 18.5 cSt at 100° C.

On Almen-Wieland machine, the breakage of the specimen occurred at a load of 1250 kg, whilst on the 4-ball Wear Tester the wear diameter of 0.54 mm is measured after a one-hour test.

When a non-dispersant commercial polymetacrylate is used under the same conditions, on the Almen-Wieland machine the breakage of the specimen occurred at a load of 250 kg, whilst on the 4-ball Wear Tester a wear diameter of 0.85 mm is observed after a one-hour test.

EXAMPLE 2

The additive is prepared under the same conditions as of Example 1, using metacryl esters prepared from methyl metacrylate and a mixture of natural fatty alcohols containing from 10 to 18 carbon atoms in the molecule (LOROL commercial brand, manufactured by the firm Henkel). The copolymerization is carried out with methyl methacrylate for a time of 20 minutes, up to a conversion of about 70%, and therafter, as the dispersant monomers, 5 g of N-vinylpyrrolidone and 5 g of N-[2-(4-methyl)-thiazole]-metacrylamide are added.

This additive is evaluated according to the methods described under Example 1 and the results are reported in Table 1.

EXAMPLE 3

The additive is prepared, under conditions similar to those of Example 1, by copolymerizing the metacryl esters of Example 1 for a time of 120 minutes, up to a complete conversion, and adding thereafter, as the dispersant monomers, 8 g of 2-vinylpyridine and 2 g of N-(2-benzothiazolyl)-methacrylamide.

This additive is evaluated according to the methods described under Example 1, and the results are reported in Table 1.

EXAMPLE 4

Under conditions similar to those described under Example 1, into a lined reactor 190 g of metacryl esters as of Example 1, 1.23 g of metacryl esters of $C_{16}$–$C_{18}$ alcohols (commercial product ALFOL 16–18, manufactured by the firm CONDEA), 250 g of mineral oil SN 150, 1.1 g of azo-bis-isobutyronitrile are loaded. Nitrogen is blown under stirring for one hour, up to the complete removal of oxygen. Thereafter, 25 g of previously deaerated methyl metacrylate are added and the temperature inside the reactor is adjusted at 87° C. The polymerization of the monomers is initiated, and is continued over 90 minutes, up to a 95% conversion. The temperature is increased to 90° C., 1.2 g of tert.butylperoctanoate and then, as dispersant monomers, 3 g of N-vinylimidazole and 7 g of N-(2-thiazolyl)-metacrylamide are added. The process is then continued as in Example 1.

This additive is evaluated according to the methods reported in Example 1 and the results are reported in Table 1.

TABLE 1

| Example No. | Turbidity of the additive at 30% in SN 150 (F.T.U.) | Asphaltene Tests | | FIAT 600 D Grams of sludge on centrifugal filter | Breakage load (kg) Almen-Wieland test | Wear diameter (mm) 4-Ball Wear Test |
|---|---|---|---|---|---|---|
| | | Dispersability Index | Turbidity before centrifugation (F.T.U.) | | | |
| 1 | 3.5 | 100 | 148 | 30 | 1250 | 0.54 |
| 2 | 2.5 | 97 | 205 | 45 | 1000 | 0.62 |
| 3 | 2.5 | 99 | 180 | 40 | 1200 | 0.54 |
| 4 | 2.7 | 98 | 192 | 40 | 1300 | 0.50 |

The nitrogen- and sulphur-containing dispersant monomers used in the experimental Examples can be prepared as follows:

N-(2-thiazolyl)-metacrylamide (a) To a solution of 0.1 mole of 2-amminothiazole in 100 ml of chloroform, a solution of 0.1 mole of $K_2CO_3$ in 30 ml of water is added, and the whole is cooled to 0° C. A solution of 0.12 mole of (freshly distilled) metacryloil chloride in 10 ml of chloroform is then added dropwise, constantly maintaining the temperature under 5° C.

At the end of the addition, the reaction mixture is stirred at 0° C. for 30 minutes and is then left standing overnight, allowing the temperature to return to room value (about 20° C.). The reaction mass is collected with water, two phases are formed, the organic phase is recovered and washed with water, and the solvent is evaporated in vacuo. The residue from the distillation is purified by chromatography over a silica column. A solid product is recovered, with a yield of 65%, which melts at 127°–128° C. after having been crystallized from hexane.

Analysis: Calculated for $C_7H_8N_2OS$: C: 50.0%, H: 4.7%, N: 16.66%; Found: C: 49.9%, H: 4.78%, N: 16.86%.

(b) Alternatively, N-(2-thiazolyl)-metacrylamide is prepared by adding 2-aminothiazole (0,1 mole) portion by portion to a solution of metacryloyl chloride (0.13 mole) and triethylamine (0.2 mole) in 100 ml of chloroform, without exceeding 35° C.

After the end of the addition, the reaction mass is kept under stirring overnight at room temperature (about 20° C.).

The mass is collected with water, two phases are formed, the organic phase is recovered and washed with water, and the solvent is evaporated in vacuo.

After purification by chromatography on a silica column, the desired product is obtained with a yield of 59%.

N-[2-(4-methyl)-thiazole]-metacrylamide

The process is carried out in a similar way to as previously described with reference to N-(2-thiazolyl)-metacrylamide, using 4-methyl-2-aminothiazole instead of 2-aminothiazole.

The reaction product is purified by distillation (boiling point 125°–130° C., under 0.5 mmHg). The desired product with melting point 75°–77° C., after crystallization from isopropyl ether, is obtained with a yield of 60%.

Analysis: calculated for $C_8H_{10}N_2OS$: C: 52.74%, H: 5.49%, N: 15.38%; Found: C: 52.44%; H: 5.46%, N: 15.2%.

N-(2-benzothiazolyl)-metacrylamide

The process is carried out in a similar way to as previously described with reference to N-(2-thiazolyl)-metacrylamide, by using 2-aminobenzothiazole in place of 2-aminothiazole. The reaction product is purified by crystallization from methanol.

The desired product, with melting point 148°–150° C., is obtained with a yield of 70%.

Analysis: calculated for $C_{11}H_{10}N_2OS$: C: 60.55%, H: 4.59%, N: 12.84%; Found: C: 60.50%, H: 4.69%, N: 12.81%.

Another dispersant monomer, useful to the purposes of the present invention, is:

N-[2-(4,6-dioctylsulpho)-1,3,5-triazine]-aminoethyl-metacrylate which can be prepared by means of the following process.

To a solution of triazine (0.1 mole) and triethylamine (0.15 mole) in chloroform, a solution of 0.13 mole of metacryloyl chloride in chloroform is slowly added, while maintaining the temperature under 30° C.

After the end of the addition, the reaction mass is heated at 30°–35° C. for two hours and is then left standing overnight, allowing it to reach room temperature (about 20° C.).

The mass is collected with water, two phases are formed, the organic phase is recovered and is washed with a diluted solution of sodium bicarbonate, the solvent is evaporated and the residue is crystallized from methanol.

The desired product with melting point 46°–48° C. is obtained with a yield of 70%.

Analysis: calculated for $C_{25}H_{44}N_4O_2S_2$: C: 60.48%, H: 8.87%, N: 11.29%; Found: C: 60.41%, H: 8.60%, N: 11.1%.

We claim:

1. Multifunctional additive for lubricating oils, constituted by a graft copolymer, with weight average molecular weight of from about 50,000 to about 600,000, consisting of a base copolymer and of an amount of grafted monomers of from 1 to 20 parts by weight per each 100 parts by weight of base copolymer:

said base copolymer being the product of the copolymerization of an alkyl metacrylate, containing from 1 to 4 carbon atoms in the alkyl radical, with an alkyl metacrylate containing from 10 to 18 carbon atoms in its alkyl radical, in such a ratio to each other that the average number of carbon atoms of the alkyl is of from 11 to 15, said grafted monomers comprising at least a member selected from the class consisting of (a): N-vinylimidazoles, N-vinylpyrrolidones, vinylpyridines and N,N-dialkylaminoethyl-metacrylates; and at least a member selected from the class of compounds definable by means of the general formula (b):

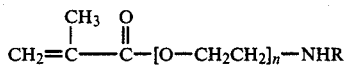

wherein:

n is 0 or 1;

R is a group selected from:

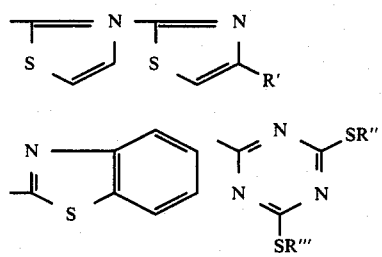

R', R" and R''' being alkyl groups containing from 1 to 18 carbon atoms.

2. Additive according to claim 1, characterized in that the alkyl metacrylate containing from 1 to 4 carbon atoms in the alkyl radical is selected from the group consisting of methyl metacrylate, ethyl metacrylate, n.propyl metacrylate and n.butyl metacrylate.

3. Additive according to claim 1, characterized in that the alkyl metacrylate containing from 10 to 18 carbon atoms in its alkyl radical is selected from the group consisting of the metacrylates of natural alcohols and of synthetic alcohols with straight or branched chain.

4. Additive according to claim 1, characterized in that the base copolymer contains from 5 to 20 parts by weight of alkyl metacrylate containing from 1 to 4 carbon atoms in its alkyl group per each 100 parts by weight of alkyl metacrylate containing from 10 to 18 carbon atoms in its alkyl group.

5. Additive according to claim 1, characterized in that said grafted monomers (a) are selected from the group consisting of N-vinylimidazole, 2-methyl-N-vinyl-imidazole, N-vinylpyrrolidone, 2-vinylpyridine, 3-vinylpyridine, 2-methyl-5-vinylpyridine, 4-methyl-2-vinylpyridine, 5-ethyl-2-vinylpyridine, 2-butyl-5-vinylpyridine and N,N-dimethyl-aminoethyl-metacrylate.

6. Additive according to claim 1, characterized in that said grafted monomers (b) are selected from the group consisting of N-(2-thiazolyl)-metacrylamide, N-[2-(4-methyl)-thiazolyl]-metacrylamide, N-[2-benzothiazolyl]-metacrylamide and N-[2-(4,6-dioctylsulpho)-1,3,5-triazine]-aminomethyl-metacrylate.

7. Additive according to claim 1, characterized in that in the graft copolymer the monomer(s) belonging to one of the classes (a) or (b) is (are) present in an amount of from 20 to 80 parts by weight per each 100 parts by weight of the total of monomers of the classes (a) and (b).

8. Additive according to claim 1, characterized in that it has a weight average molecular weight of from about 100,000 to about 400,000.

9. Process for the preparation of the additive according to claim 1, comprising:

copolymerizing at least one alkyl metacrylate containing from 1 to 4 carbon atoms in its alkyl radical with at least one alkyl metacrylate containing from 10 to 18 carbon atoms in its alkyl radical, until from 60 to 100 of the monomers are converted into their related copolymer;

completing the copolymerization if necessary in a second step until the functional monomers are grafted.

10. Process according to claim 9, characterized in that the reaction is carried out in mineral oil, at 70°–130° C. in the presence of at least a radicalic catalyst in an amount of from 0.2 to 3 parts by weight per each 100 parts by weight of the metacryl esters and possibly in the presence of a sulphur-containing substance in an amount of from 0.01 to 0.5 parts by weight per each 100 parts by weight of metacryl esters, for a time of from 0.5 to 4 hours in the first step and of from 3 to 6 hours in the second step.

11. Process according to claim 10, characterized in that said initiator for the first step polymerization is selected from the group consisting of tert.butyl-peroctanoate, tert.butyl-per-(2-ethyl)-hexanoate, tert.butyl-perisononanoate, tert.butyl-perbenzoate, azo-bis-isobutyronitrile, dibenzoylperoxide, di-lauroylperoxide and bis-(4-tert.butyl-cyclohexyl)-peroxide dicarbonate.

12. Process according to claim 10, characterized in that said initiator, for the second step polymerization is selected from the group consisting of tert.butyl-peroctanoate, tert.butyl-per-(2-ethyl)-hexanoate, tert.butyl-per-isononanoate and tert.butyl-perbenzoate.

13. Process according to claim 10, characterized in that said sulphur-containing substance is selected among aliphatic mercaptans, thioglycols and thiophenols.

14. Compositions of lubricating oil comprising a major proportion of lubricating oil and a minor proportion of the additive of claim 1.

* * * * *